Sept. 24, 1968    A. MOLBACH    3,402,813
LAMP BULB CONVEYOR MECHANISM
Filed Oct. 12, 1966
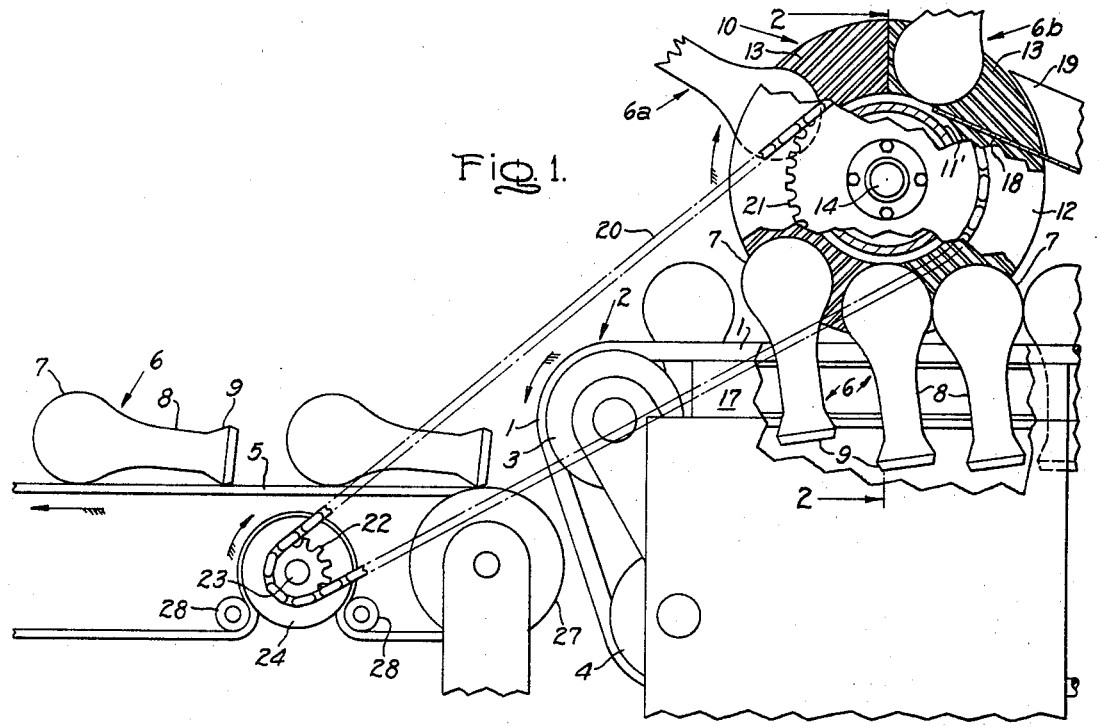
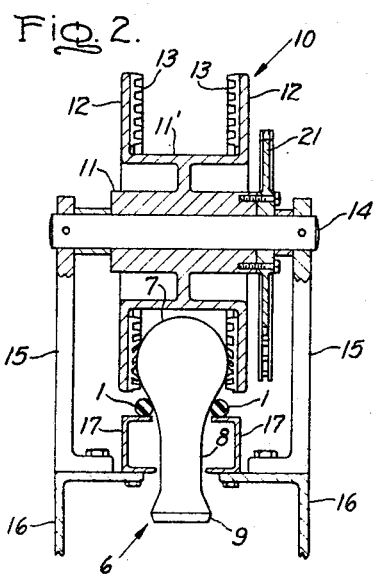
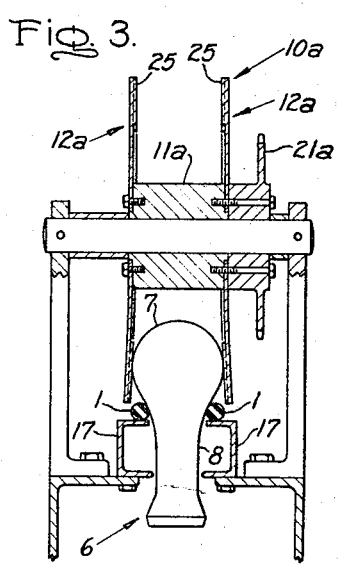
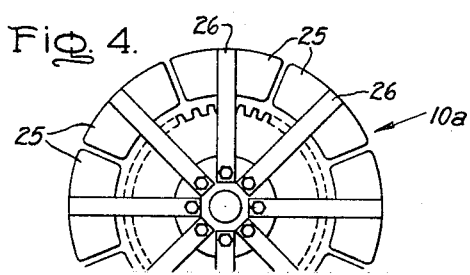
Inventor:
Arne Molbach
by *Otto Firchy*
His Attorney United States Patent Office 3,402,813
Patented Sept. 24, 1968

3,402,813
LAMP BULB CONVEYOR MECHANISM
Arne Molbach, Ivrea, Turin, Italy, assignor to General Electric Company, a corporation of New York
Filed Oct. 12, 1966, Ser. No. 586,212
7 Claims. (Cl. 209—80)

ABSTRACT OF THE DISCLOSURE

In a lamp bulb conveyor lane wherein an accumulation of bulbs is required to maintain a constant supply in a downstream section of the lane which runs intermittently when there is a demand for bulbs but is otherwise stopped, the accumulation is achieved in an upstream section of the lane consisting of a pair of constantly running round belts between which the bulbs are suspended. At the end of the accumulating section there is an escapement device which prevents the bulbs from piling up on the downstream belt when the latter is stopped. This escapement device is made to perform a dual function by making it in the form of a gripper wheel having spaced discs and which is mounted so that it straddles the path of movement of the upper bowl sections of bulbs near the end of the upstream belts and is driven by the intermittently running belt so that when the latter belt is stopped, the wheel is also stopped with one or more bulbs gripped thereby and the bulb accumulation is held back. There is also provided suitable mechanism to insure that normal bulbs will be released from the gripper wheel to continue their travel whereas broken bulbs with no cullets will be carried away by the gripper wheel and discharged.

---

This invention relates generally to conveyor mechanisms for glass electric lamp bulbs which have a maximum diameter bulbous portion which tapers down to a generally cylindrical neck portion and terminates in an enlarged cullet portion. More particularly the invention relates to a novel mechanism which will function as a bulb escapement device and which, in accordance with another aspect of the invention, will operate to remove from a conveyor those defective bulbs which are devoid of a cullet portion.

The invention will be particularly described herein in connection with a system wherein, at one or more places in a conveyor lane between the bulb-loading station and the lamp-making equipment, there is need for a bulb accumulation which serves to dampen the fluncutations in the loading and assure a constant and uniform supply of bulbs to the equipment. To achieve this accumulation, a section of the lane consists of a first conveyor comprising a pair of continuously moving belts spaced apart a distance such as to support the bulb in a vertical position by its bowl portion. Downstream of this section the lane comprises a second conveyor including an intermittently running belt which runs when there is a demand for bulbs but is otherwise stopped.

It will be evident that there is a need for a device at the end of the accumulating section which will prevent the bulbs from piling up on the downstream belt when the latter is stopped. Also, since in the illustrated system the downstream conveyor is a flat belt on which the bulbs lie end-to-end rather than hanging vertically as in the first conveyor belts, it is necessary to space the bulbs as they are released from the accumulation in order to provide for the greater length of conveyor occupied by a bulb lying horizontally.

It is an object of the invention to provide a device which will effectively perform the functions described above. It is a further object to provide a device which will remove from a conveyor defective or broken bulbs which have no cullet portion.

In accordance with one aspect of the invention, there is provided a gripper wheel member having resilient opposed faces which straddle the path of travel of the bowl portions of bulbs on the first conveyor belts. The wheel faces are so spaced as to grip a bulb which is carried between them and tend to lift the bulb off the belts and carry it with the wheel as it turns. There are also provided a pair of spaced restraining rails between which the necks of the bulbs pass as they are carried to the gripper wheel. Whereas the rails are so spaced that the necks of the bulbs slide easily between them, when the wheel grips a bulb and tends to pull it up off the belts it will be restrained by engagement of the cullet portion with the rails and pulled free of the wheel and proceed along the belts. However, defective or broken bulbs which are devoid of a cullet are not restrained by the rails and are therefore carried along with the wheel from which they are removed by a suitable mechanism such as a stripper member.

In accordance with a further aspect of the invention, in a system such as described above, the escapement function is provided by driving the gripper wheel in synchronism with the intermittently operating second conveyor so that when said second conveyor is stopped, the wheel is also stopped and the bulb accumulation is held back.

Such a device has advantages over other escapement devices, among which are the broken bulb removal feature, the avoidance of rigid indexing by metallic parts, elimination of a separate pneumatic or motor drive, and simplicity of both construction and operation.

Further features and advantages of the invention will appear from the following detailed description of species thereof, and from the drawing wherein:

FIG. 1 is a fragmentary side elevation of a conveyor system comprising the invention;

FIG. 2 is a section, taken along the lines 2—2 of FIG. 1, of the gripper wheel and associated restraining rail members;

FIG. 3 is a section, corresponding to FIG. 2, showing a modified form of gripper wheel; and FIG. 4 is a side view of the gripper wheel shown in FIG. 3.

Referring to FIGS. 1 and 2 of the drawing, the conveyor system illustrated therein comprises a first conveyor including a pair of horizontally spaced endless belts 1 which are driven continuously along a path including an upper horizontal run 2 and around upper and lower pulleys 3 and 4 at the downstream or discharge end of the run. Downstream of the first conveyor, there is a second conveyor comprising an endless flat belt 5 which runs intermittently when there is a need for bulbs, and which receives the bulbs from the conveyor belts 1.

The glass bulbs 6 each comprises a bulbous (spherical) bowl portion 7 of maximum diameter which tapers to a generally cylindrical neck portion 8 and terminates in an enlarged cullet portion 9. The bulbs are supported vertically by their bowl portions 7 on the belts 1 and are delivered therefrom to the flat belt 5 on which they lie in end-to-end horizontal position.

In accordance with the invention, the escapement and broken bulb removal mechanism comprises a gripper wheel 10 having a hub 11 which carries a pair of spaced metal disc portions 12 having resilient opposed faces 13 which may be formed of any suitable resilient material, here illustrated as sections or pads of rubber sheet provided with a multiplicity of flexible protuberances, in this case parallel ribs or cleats. The wheel 10 is mounted for rotation on a shaft 14 (FIG. 2) in support bracket 15 on frame member 16, in such a position that it straddles the path of travel of the bowl portions 7 of bulbs 6 on the conveyor belts 1 adjacent the downstream end of the horizontal run 2 thereof, so that the bulbs must pass between the gripper faces 13 of the discs 12. The said faces 13 of the discs are so spaced that they will grip the bowl 7 of a bulb which is carried between them and tend to lift the bulb off the belts 1 and carry it with the wheel 10 as it turns.

As the bulbs 6 on belts 1 approach the gripper wheel 10, the neck portions 8 thereof are guided betwen a pair of restraining rails, here illustrated as a pair of U-shaped beam members 17 which are mounted on their sides in opposed relationship on frame members 16, and which extend along and under the downstream end portion of the horizontal run 2 of the belts 1. Preferably, the belts 1 ride on the upper faces of the rails 17 under the gripper wheel 10 so that the bulbs 6 and belts 1 are firmly held against downward displacement by said gripper wheel upon engagement therewith. The rails 17 are spaced apart far enough that the necks 8 of the bulbs 6 slide between them, but close enough together so that, if one attempts to lift a bulb off the conveyor belts 1, the rails prevent this by restraining the larger diameter cullet 9.

Thereby, as the wheel 10 turns, it grips the bulbs 6 and tends to pull them along its circular path. As the bulbs reach the point where the wheel 10 wants to lift them off the belts 1, bulbs with cullets 9 will be held down by the rails 17, pull themselves free of the wheel 10, and proceed along the belts 1 to the flat belt 5. Bulbs without cullets, such as shown at 6a and 6b in FIG. 1, will not be restrained by the rails 17 and will be carried along with the wheel 10 until they are removed by a suitable mechanism. One suitable such bulb removal mechanism, shown in FIG. 1, comprises a plow or stripper plate member 18 which is fixedly mounted to extend into the space between the disc portions of the wheel 10 to a point adjacent the periphery 11' of the hub and at a downwardly inclined angle away from the hub portion, and at the side of the wheel where the bulbs 6a and 6b are beginning to be carried in a downward direction. The bulbs 6a and 6b are carried away in a discharge chute 19.

In order to accompilsh the escapement effect, and also to space the bulbs 6 horizontally along the flat belt 5, the gripper wheel 10 is driven in synchronism with the intermittently running belt 5. This may be accomplished by direct coupling of the wheel and belt through a drive chain 20 which runs around a sprocket 21 mounted on the hub 11 of the wheel, and a sprocket 22 on a shaft 23 which is attached to a pulley 24 around which the belt 5 runs. The endless belt 5 also runs around a pulley 27 adjacent to the delivery end of conveyor belts 1, and snubber pulleys 28 are also provided to wrap the belt 5 around the drive pulley 24 to insure traction. Thereby, when the belt 5 is stopped, the wheel 10 is also stopped and the bulb accumulation is held back on the belts 1. The sprockets 21 and 22 are so proportioned that the ratio of speed of wheel 10 to speed of belt 5 is such that the bulbs are released at intervals corresponding to the desired bulb spacing on the flat belt 5. It will be evident that side rails (not shown) may be provided along apposite sides of the flat belt 5 if needed to retain the bulbs on the belt.

In FIGS. 3 and 4 there is shown a modified form of gripper wheel 10a wherein the disc portions 12a are composed of a series of separate arcuate metal pad members 25 which are carried by leaf spring members 26 attached to the hub 11a to provide the necessary resilience for gripping the bowl portions 7 of the bulbs 6 between an opposed pair of pads 25 on the discs 12a. The associated rails 17 and conveyor belts 1 are those shown and described in connection with FIGS. 1 and 2.

It will be understood by those skilled in the art that although a specific type of conveyor system has been shown and described to illustrate the invention, various modifications, omissions and other changes may be made within the spirit and scope of the invention as defined in the appended claims.

What I claim as new and desire to secure by Letters Patent of the United States is:

1. In a conveyor system for electric lamp bulbs having a maximum diameter bulbous portion tapering to a generally cylindrical neck portion and terminating in an enlarged cullet portion, the combination of a first conveyor member including a pair of horizontally spaced endless belts and means for continuously driving said belts along a path including an upper horizontal run where said bulbs are suspended between the belts in a vertical position by their bowl portions and carried along said run, a second intermittently operating conveyor means having a portion thereof located adjacent the downstream discharge end of said first conveyor member in position to receive bulbs therefrom, and an escapement and broken bulb removal mechanism comprising a pair of horizontally spaced rigid restraining rail members fixedly mounted to extend along and under the downstream end portion of the said horizontal run of the first conveyor belts in such position that the restricted neck portions of the bulbs pass therebetween with the enlarged cullet portions below the rails, a gripper wheel member comprising a hub portion carrying a pair of spaced disc portions with resilient opposed faces straddling the path of travel of the bowl portions of bulbs on said conveyor belts adjacent the downstream end of the horizontal run thereof and over a portion of said restraining rails, said disc portions being spaced apart a distance such as to firmly grip therebetween the bowl portions of bulbs carried therebetween by said conveyor belts and tending to lift the bulbs and carry them with the wheel whereby defective bulbs devoid of a cullet are so lifted but bulbs having an intact cullet portion are restrained by said rail members and pulled free of the gripper wheel to drop back on said conveyor belts for delivery to said second conveyor means, means driving said gripper wheel in synchronism with said second conveyor means so that interruption in movement of the second conveyor means also results in interruption of rotation of the gripper wheel with consequent accumulation of bulbs on said belts of the first conveyor member, and means effecting removal from the gripper wheel of defective bulbs carried thereby off the said belts of the first conveyor member.

2. A conveyor system as set forth in claim 1 wherein the resilient opposed faces of said gripper wheel member are composed of rubber-like facings on rigid disc portions.

3. A conveyor system as set forth in claim 1 wherein the belts of said first conveyor member ride on upper faces of said rail members under the gripper wheel so that the bulbs and the belts are firmly held against downward displacement by said gripper wheel upon engagement therewith.

4. A conveyor system as set forth in claim 1 wherein the said means effecting removal from the gripper wheel of defective bulbs carried thereby comprises a stripper plate member fixedly mounted to extend into the space between the disc portions of the wheel to a point adjacent the periphery of the hub portion and at a downwardly inclined angle away from said hub portion and at the side of the wheel where bulbs therein are beginning to be carried in a downward direction.

5. In a conveyor system for electric lamp bulbs having a maximum diameter bulbous portion tapering to a generally cylindrical neck portion and terminating in an enlarged cullet portion, the combination of a conveyor member including a pair of horizontally spaced endless belts and means for continuously driving said belts along a path including an upper horizontal run where said bulbs are suspended between the belts in a vertical position by their bowl portions and carried along said run, and an escapement and broken bulb removal mechanism comprising a pair of horizontally spaced rigid restraining rail members fixedly mounted to extend along and under the downstream end portion of the said horizontal run of the conveyor belts in such position that the restricted neck portions of the bulbs pass therebetween with the enlarged cullet portions below the rails, a gripper wheel member comprising a hub portion carrying a pair of spaced disc portions with resilient opposed faces straddling the path of travel of the bowl portions of bulbs on said conveyor belts adjacent the downstream end of the horizontal run thereof and over a portion of said restraining rails, said disc portions being spaced apart a distance such as to firmly grip therebetween the bowl portions of bulbs carried therebetween by said conveyor belts and tending to lift the bulbs and carry them with the wheel whereby defective bulbs devoid of a cullet are so lifted but bulbs having an intact cullet portion are restrained by said rail members and pulled free of the gripper wheel to drop back on said conveyor belts, means rotating said gripper wheel intermittently so that interruption of rotation thereof effects an accumulation of bulbs on said conveyor belts, and means effecting removal from the gripper wheel of defective bulbs carried thereby off the said conveyor belts.

6. A conveyor system as set forth in claim 5 wherein the belts of said first conveyor member ride on upper faces of said rail members under the gripper wheel so that the bulbs and the belts are firmly held against downward displacement by said gripper wheel upon engagement therewith.

7. A conveyor system as set forth in claim 5 wherein the said means effecting removal from the gripper wheel of defective bulbs carried thereby comprises a stripper plate member fixedly mounted to extend into the space between the disc portions of the wheel to a point adjacent the periphery of the hub portion and at a downwardly inclined angle away from said hub portion and at the side of the wheel where bulbs therein are beginning to be carried in a downward direction.

References Cited
UNITED STATES PATENTS 2,696,909    12/1954    Strnad    209—80
3,124,231    3/1964    Ott    198—165

RICHARD E. AEGERTER, *Primary Examiner.*